US012431111B1

(12) United States Patent
Jacobs-Jones

(10) Patent No.: US 12,431,111 B1
(45) Date of Patent: Sep. 30, 2025

(54) CHIN REST FOR MUSICAL INSTRUMENT

(71) Applicant: Nikole Elizabeth Jacobs-Jones, Reno, NV (US)

(72) Inventor: Nikole Elizabeth Jacobs-Jones, Reno, NV (US)

( * ) Notice: Subject to any disclaimer, the term of this patent is extended or adjusted under 35 U.S.C. 154(b) by 258 days.

(21) Appl. No.: 18/144,128

(22) Filed: May 5, 2023

Related U.S. Application Data

(60) Provisional application No. 63/338,791, filed on May 5, 2022.

(51) Int. Cl.
*G10D 3/18* (2020.01)

(52) U.S. Cl.
CPC .................................... *G10D 3/18* (2013.01)

(58) Field of Classification Search
CPC .................................. G10D 3/18; G10D 3/00
See application file for complete search history.

(56) References Cited

U.S. PATENT DOCUMENTS

| | | | | |
|---|---|---|---|---|
| 4,534,259 A * | 8/1985 | Wolf | G10D 3/18 84/311 | |
| 2007/0175309 A1* | 8/2007 | Buttemer | G10D 3/18 84/279 | |
| 2022/0157278 A1* | 5/2022 | Richter | G10D 3/18 | |

* cited by examiner

*Primary Examiner* — Kimberly R Lockett
(74) *Attorney, Agent, or Firm* — Plager Schack LLP; Mark H. Plager; Naomi Mann

(57) ABSTRACT

Disclosed is a support device for a musical instrument comprising a cushioned and/or silicon material. In some embodiments, the device may include an adhesive for attachment to the musical instrument. In certain embodiment, the device may be a chin rest for an instrument such as a violin or viola.

13 Claims, 3 Drawing Sheets

CHIN REST FOR MUSICAL INSTRUMENT

RELATED APPLICATION

This application claims priority to provisional patent application U.S. Ser. No. 63/338,791 filed on May 5, 2022, the entire contents of which is herein incorporated by reference.

BACKGROUND

The present disclosure relates generally to a chin rest or other support device for musical instruments.

Players of musical instruments may use a support device, such as a chin, finger, and/or shoulder rest. As such, an improved musical instrument support device which provides enhanced comfort and/or functionality is desirable.

SUMMARY

According to various embodiments, disclosed is device for a musical instrument comprising a cushioned and/or silicon material. In some embodiments, the device may include an adhesive for attachment to the musical instrument. In certain embodiment, the device may be a chin rest for an instrument such as a violin or viola. In other embodiments, the device may be a finger rest. In some other embodiments, the device may be a shoulder rest. The cushioned and/or silicon material provides increased comfort and stability when anchoring the instrument to the user's chin or otherwise handling the instrument by the player.

According to various embodiments, disclosed is a method of using a musical instrument, the method comprising: providing a device for supporting a user's chin, finger, or shoulder on a musical instrument, the device comprising a main body having a bottom surface shaped to conform to a surface of the musical instrument on which the device is placed, and a top contoured surface, wherein the main body is made of a cushioned material; and placing the device on the surface of the musical instrument prior to playing the musical instrument. In some embodiments, the device is a chin rest configured to support the user's chin on the musical instrument. In certain embodiments, the cushioned material is silicone. In some embodiments, the device further comprises an adhesive on the bottom surface of the main body. In some embodiments, the adhesive is configured to enable the device to attach and be removed from the surface of the musical instrument, without damaging the musical instrument. In some embodiments, the device further comprises a protective backing over the adhesive on the bottom surface. In some embodiments, the top contoured surface of the device is convex.

BRIEF DESCRIPTION OF THE FIGURES

The detailed description of some embodiments of the invention will be made below with reference to the accompanying figures, wherein the figures disclose one or more embodiments of the present invention.

DETAILED DESCRIPTION OF CERTAIN EMBODIMENTS

A chin rest is an attachment to an instrument that assists in anchoring the instrument to the player's chin. However, the hard material of a conventional chin rest may cause user discomfort and even bruising from pressing against the chin rest while playing the instrument.

Figure 1:
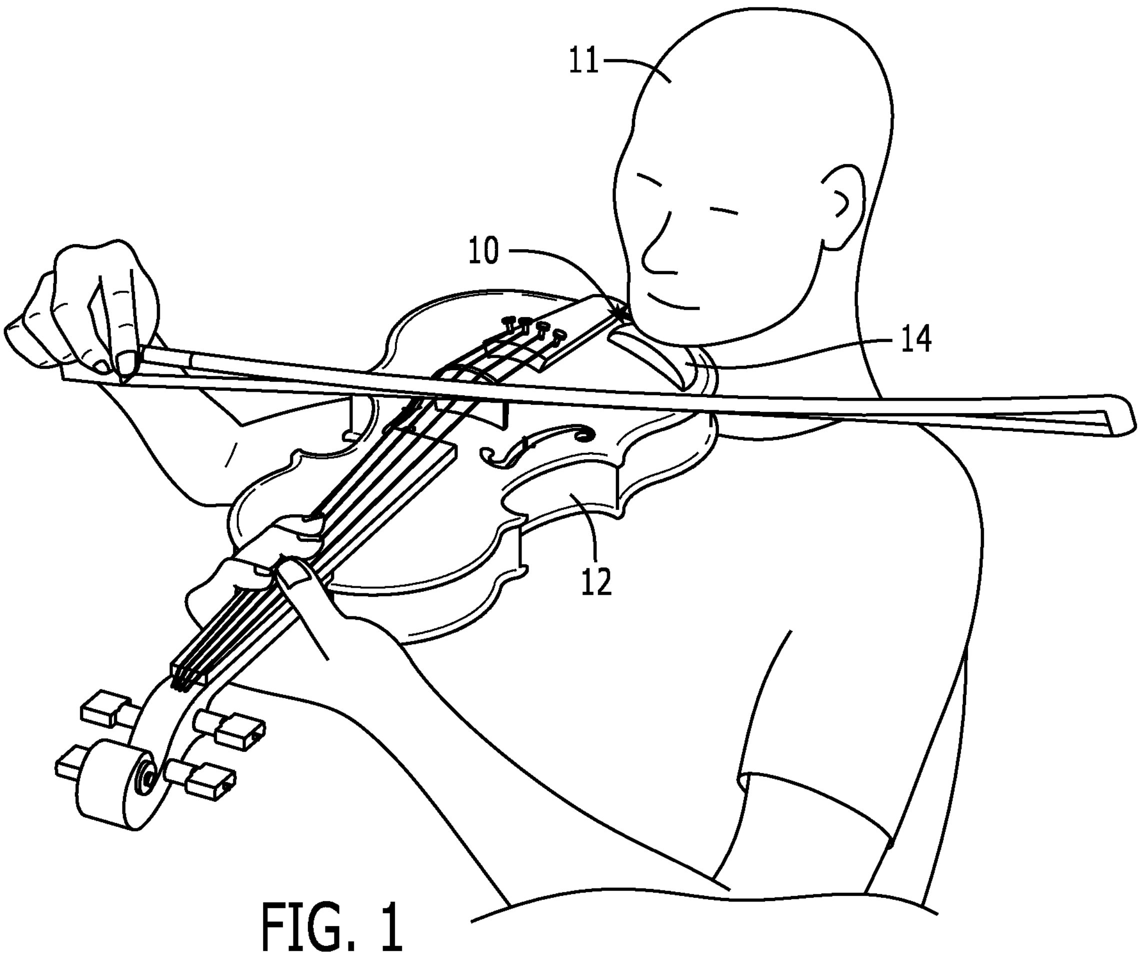
FIG. 1 is a front perspective view of a chin rest for a musical instrument shown in use, according to certain embodiments.
Figure 2:
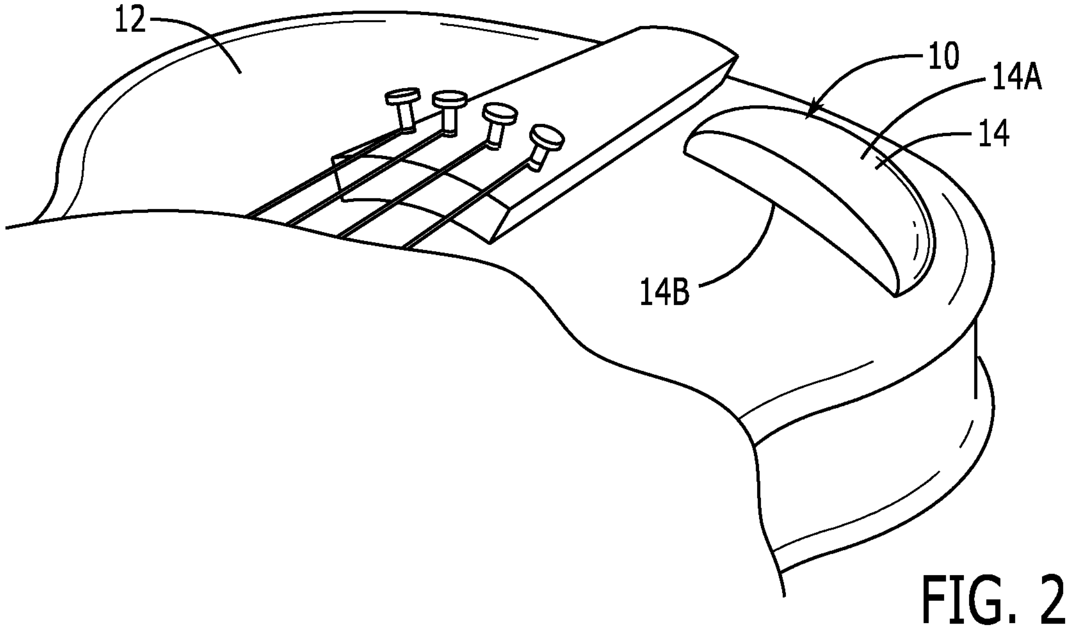
FIG. 2 is a detailed perspective view of the chin rest of FIG. 1.
Figure 3:
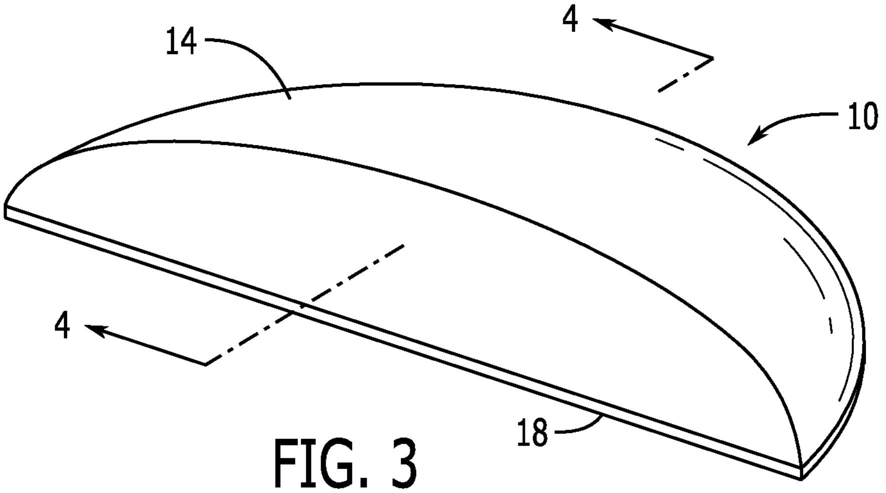
FIG. 3 is a detailed perspective view of the chin rest of FIG. 1 shown without the instrument.
Figure 4:
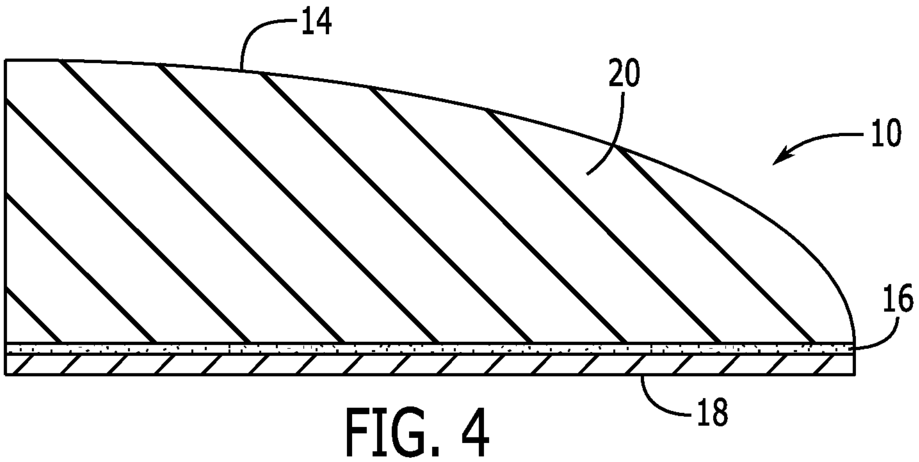
FIG. 4 is a cross-sectional view, taken on line 4-4 of FIG. 3.
Figure 5:
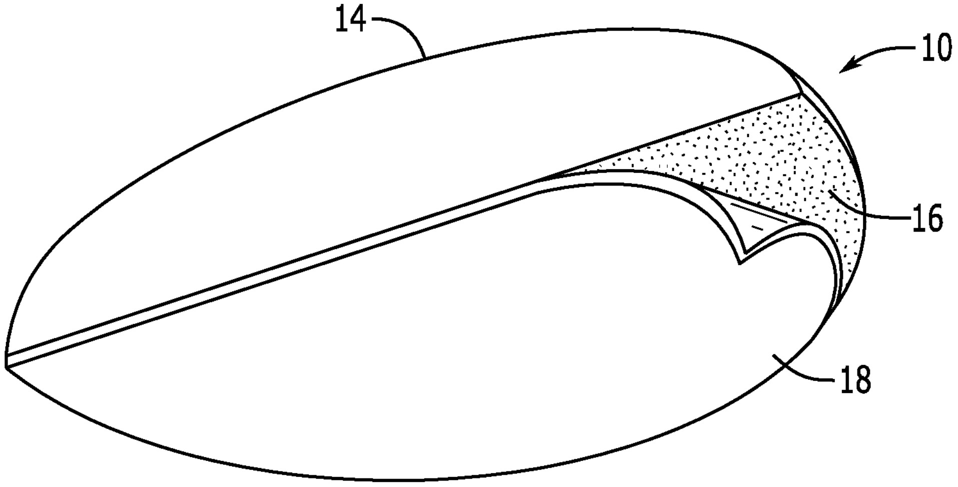
FIG. 5 is a detailed perspective view showing an adhesive and protective backing of the chin rest, according to certain embodiments.
Figure 6:
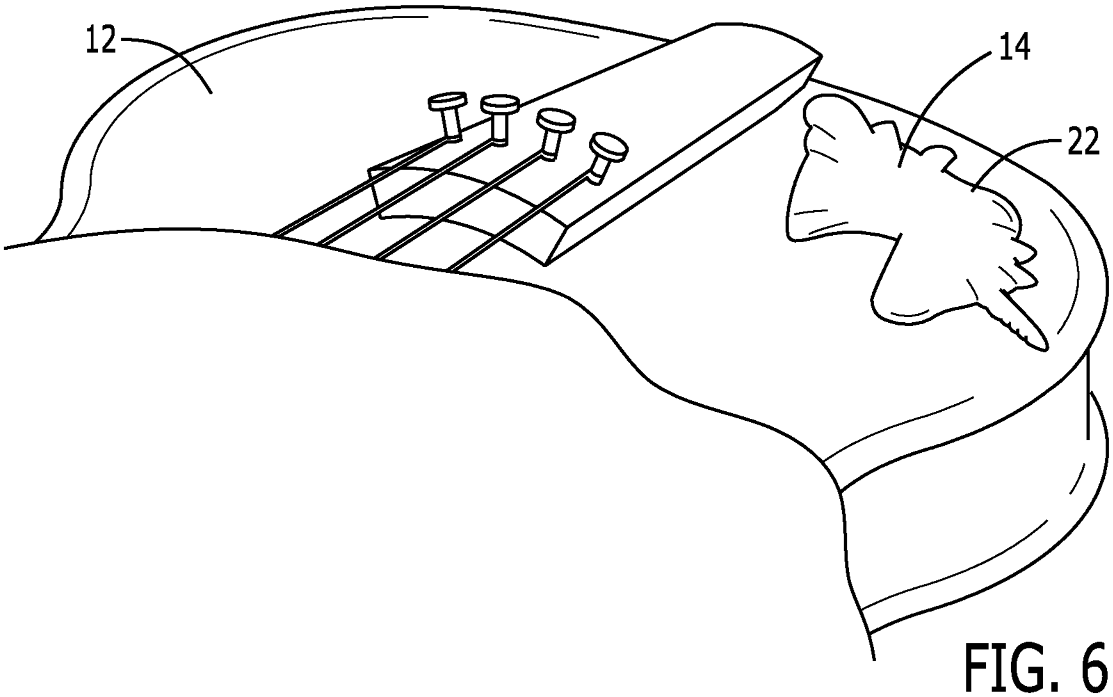
FIG. 6 is a detailed perspective view, similar to FIG. 2, showing an alternate embodiment of the chin rest.

To address this problem, the disclosed subject matter introduces a support device 10 for a musical instrument 12 which has a main body made of a cushioned material 20 such as silicone, as depicted in FIGS. 1-6. According to various embodiments, device 10 may be a chin rest 14 (e.g., for a violin, viola, and the like), which may be shaped to support the chin of a user 11. In other embodiments, device 10 may be a finger rest (e.g., for a bow of a violin), and/or shoulder rest.

In one embodiment, chin rest 14 may have a bottom surface 14B which is shaped in conformance to the upper surface of instrument 12. For example, bottom surface 14B may be substantially flat to conform to the substantially flat upper surface of a violin. In some embodiments, chin rest 14 may further have a top surface 14A which is contoured/curved for providing comfortable chin support. In one embodiment as shown in FIGS. 1-5, top surface 14A may be convex or dome shaped. In other embodiments, top surface 14A may have a fanciful design, such as the unicorn shape 22 shown in FIG. 6. In certain embodiments, device 10 may further include indentation(s) for the chin and/or finger(s) of the user. It shall be appreciated that various shapes and sizes may be employed in alternate embodiments. In certain embodiments, the user may cut and/or reshape material 20 to create a custom design suitable for his/her needs. This may be particularly beneficial for beginner players and/or children.

In certain embodiments, device 10/chin rest 14 may be configured to adhere to the surface of instrument 12. In some further embodiments, device 10/chin rest 14 may also be configured to be easily removed after it has been adhered, without damaging the instrument. In one embodiment, device 10 may comprise an adhesive material 16 at its bottom surface which may include a protective backing 18. In certain embodiments, protective backing 18 may be removable and replaceable for reuse. However, in some embodiments, device 10/chin rest 14 may be made of a high friction material such as silicone which may self-adhere to the surface of the instrument without adhesive.

Device 10/chin rest 14 provides a cushioned and comfortable contact surface for the user's chin in contrast to conventional chin rests or a contact surface of the instrument, which may be hard and uncomfortable. Additionally, as the device may be adhered to and removed from to the surface of the instrument, user 11 may easily adjust the position of the device to suit the user's exact needs while playing the instrument.

In certain embodiments, device 10 may be configured as a chin rest for placement on the chin support area of a violin or viola. In alternate embodiments, the device may be configured as a finger rest, which may be attached to the bow of the instrument. In some further embodiments, the device may be configured as a shoulder rest for supporting the user's shoulders. Additionally, the device may be made in various fanciful designs (e.g., animal figures such as the unicorn shown in FIG. 6) and/or include decorations (e.g., glitter, artwork, colors) to make it more appealing to children.

In one embodiment, the device may be made by providing a mold for a chin rest, finger rest, or shoulder rest. Silicon may then be poured into the mold. Once the silicone is cured and finished, a self-adhesive residue may then be applied to the bottom surface of the device. Colors, designs, or other decorative elements may also be added. In other embodiments, the device's shape may be cut out from the cushioned/silicone material to suit the user's needs/preferences.

The disclosed device provides a high degree of comfort for players of musical instruments that may require chin, shoulder, and/or finger rests. The disclosed device is designed to peel off the instrument after it has been attached, without damaging the instrument. Additionally, the device may be customized to suit the user's needs and/or artistic preferences.

It shall be appreciated that the disclosed device can have multiple configurations in different embodiments. For example, the device may include bottom suction cups instead of adhesive. In one embodiment, such suction cups may be made to resemble the tentacles of an octopus to add novelty and appeal to the user.

It shall be appreciated that the components of the device described in embodiments herein may comprise any alternative known materials or combination of materials in the field and be of any size and/or dimensions. It shall be appreciated that different types of silicone and/or other soft materials/rubbers, may be used in alternate embodiments. It shall be appreciated that components of the device described herein may be manufactured and assembled using any known techniques in the field.

It shall be understood that the orientation or positional relationship indicated by terms such as "upper", "lower", "front", "rear", "left", "right", "top", "bottom", "inside", "outside" is based on the orientation or positional relationship shown in the accompanying drawings, which is only for convenience and simplification of describing the disclosed subject matter, rather than indicating or implying that the indicated device or element must have a specific orientation or are constructed and operated in a specific orientation, and therefore should not be construed as a limitation of the present invention.

As used herein, the articles "a" and "an" are intended to include one or more items, and may be used interchangeably with "one or more." Where only one item is intended, the term "one" or similar language is used. Also, as used herein, the terms "has", "have", "having", "with" or the like are intended to be open-ended terms. Further, the phrase "based on" is intended to mean "based, at least in part, on" unless explicitly stated otherwise.

The constituent elements of the disclosed device and system listed herein are intended to be exemplary only, and it is not intended that this list be used to limit the device of the present application to just these elements. Persons having ordinary skill in the art relevant to the present disclosure may understand there to be equivalent elements that may be substituted within the present disclosure without changing the essential function or operation of the device. Terms such as 'approximate,' 'approximately,' 'about,' 'substantially,' etc., as used herein indicate a deviation of within +/−10%. Relationships between the various elements of the disclosed device as described herein are presented as illustrative examples only, and not intended to limit the scope or nature of the relationships between the various elements. Persons of ordinary skill in the art may appreciate that numerous design configurations may be possible to enjoy the functional benefits of the inventive systems. Thus, given the wide variety of configurations and arrangements of embodiments of the present invention the scope of the invention is reflected by the breadth of the claims below rather than narrowed by the embodiments described above.

What is claimed is:

1. A method of using a musical instrument, the method comprising:

attaching a device for supporting a user's chin, finger, or shoulder on a top surface of a musical instrument, the device comprising a main body having a bottom surface shaped to conform to the top surface of the musical instrument on which the device is placed, and a top contoured surface, wherein the main body is made of a cushioned material comprising silicone;

wherein the device is attached to the top surface of the musical instrument via adhesion between the bottom surface of the device and the top surface of the musical instrument, wherein the device is configured to be detached from and reattached to the top surface of the musical instrument using normal hand force and without extraneous attachment hardware, such that the location of the device on the top surface of the instrument is adjustable while the instrument is held in position for playing, wherein the main body of the device is uniformly composed and has a body thickness extending continuously between the top contoured surface and the bottom surface of the device.

2. The method of claim 1, wherein the device is a chin rest configured to support the user's chin on the musical instrument.

3. The method of claim 1, the device further comprising an adhesive on the bottom surface of the main body.

4. The method of claim 3, wherein the adhesive is configured to enable the device to attach and be removed from the surface of the musical instrument, without damaging the musical instrument.

5. The method of claim 3, the device further comprising a protective backing over the adhesive on the bottom surface.

6. The method of claim 1, wherein the top contoured surface of the device is convex.

7. The method of claim 1, wherein the device is a shoulder rest.

8. The method of claim 1, wherein the device is a finger rest.

9. The method of claim 1, further comprising adjusting the location of the device on the surface of the musical instrument.

10. The method of claim 1, further comprising cutting the main body of the device to a desired shape.

11. The method of claim 1, wherein the musical instrument is a violin or a viola.

12. The method of claim 1, the device further comprising a suction element on the bottom surface of the main body.

13. The method of claim 9, further comprising detaching and reattaching the device to the surface of the musical instrument while the instrument is held in position for playing.

* * * * *